United States Patent [19]

Shaner et al.

[11] 4,361,612

[45] Nov. 30, 1982

[54] MEDIUM DENSITY MIXED HARDWOOD FLAKE LAMINA

[75] Inventors: Kenneth H. Shaner, Monroe; Bruce J. Thoman, Chester; Mark D. Peterson, Cornwall-on-Hudson; David A. Fergus, Goshen, all of N.Y.; Karl K. Chiang, Vancouver, Wash.

[73] Assignee: International Paper Co., New York, N.Y.

[21] Appl. No.: 283,162

[22] Filed: Jul. 14, 1981

[51] Int. Cl.³ ............... B32B 21/02; B32B 21/08; B32B 21/14
[52] U.S. Cl. ..................... 428/106; 428/114; 428/402; 428/528; 428/529; 428/535; 428/537
[58] Field of Search ............... 428/402, 528, 529, 535, 428/537, 106, 114

[56] References Cited

U.S. PATENT DOCUMENTS 4,246,310  1/1981  Hunt et al. .................. 428/528

Primary Examiner—Marion McCamish
Attorney, Agent, or Firm—Donald E. Degling

[57] ABSTRACT

A lamina for a medium density structural board made from dimensioned wood flakes cut from a mixture of hardwood species and having a high retained internal bond strength is disclosed. The wood flakes are blended with a phenol formaldehyde resin having a major quantity of a low molecular weight fraction and a wax and then formed into a hot pressed product. The lamina may be used alone or as the core of a structural board having veneer, hardboard or plywood face panels. Three or more lamina may be formed into a structural board or used as the core of a board having veneer, hardboard or plywood face panels.

29 Claims, No Drawings

MEDIUM DENSITY MIXED HARDWOOD FLAKE LAMINA

BACKGROUND OF THE INVENTION

1. Field of the Invention

The present invention relates to a medium density structural flakeboard lamina and more specifically to a board using such a lamina made from a mixture of hardwood species wherein the flakes are sized and oriented randomly or aligned along the length or width of the lamina and the resin is a phenol formaldehyde resin having a major quantity of a low molecular weight fraction. A medium density structural flakeboard lamina according to the invention may be used as the core of a structural board having veneer, hardboard or plywood face panels, or three or more lamina may be laid up to form a board wherein the flakes in the face lamina are oriented along the length of the panel and the flakes in the core lamina are oriented across the length of the panel or randomly oriented.

2. Prior Art

For many years, manufactured board products have been used in the form of panels for structural purposes, including roof and wall sheathing and flooring. Originally, such panels were made from plywood, but, in more recent years, consideration has been given to composite boards formed from wood dust, particles, strands, or flakes. This consideration results, in part, from the shortage of high quality peeler logs suitable for the veneer used to make plywood. Further, there has been a desire to use the waste materials from sawmills and plywood plants as the furnish for saleable composite boards. More recently, attempts have been made to use the hardwood species which are found on the softwood timber sites.

The Clark and Mottet U.S. Pat. No. 2,689,092 (1954) disclosed a method and apparatus for forming cross-cut flakes from softwood lumber, such as split logs, small roundwood, and sawmill trim. Cross-cut flakes were formed by positioning the edge of the cutting knife parallel to the wood fiber and moving it during the cutting operation normal to the fiber so as to avoid the breakage and curling of the fiber characteristic of planer shavings where the cutting action is in the direction of the fiber. Such cross-cut flakes were used by Clark and Mottet for boards or panels in which the flakes were oriented in a random manner in the plane of the board face. Boards formed in this way were characterized by essentially uniform physical properties in both the length and width dimensions. See Clark U.S. Pat. Nos. 2,773,789 (1956) and 2,773,790 (1956). The product of the Clark and Mottet process was known as a "flakeboard" and utilized waste softwood, typically Douglas fir, and 2 to 4 percent of a phenol formaldehyde, urea formaldehyde, or melamine resin consolidated to a specific gravity of about 1 (i.e., a density of about 64 pounds per cubic foot) on an oven dry weight and volume basis. Although the product was generally comparable in strength to plywood, the density was high and well outside the range of medium density products (e.g., 40–50 pounds per cubic foot).

Elmendorf U.S. Pat. No. 3,164,511 (1965) disclosed a board composed of cross-cut wood flakes or strands oriented generally along the length of the board so that the average acute angle of the crossing strands was less than about 40°. Elmendorf found, in tests using the softwoods Douglas fir and hemlock, that by controlling the orientation of the wood flakes or strands within the 40° average strand crossing level, the modulus of rupture along the length of the board was equal to or greater than that of plywood for laminates having a specific gravity in the range of 0.65 to 0.90 (about 40–56 pounds per cubic foot), and incorporating about 4 percent of a phenolic resin binder.

Another approach to the construction of a wood composition panel is revealed by the Himmelheber U.S. Pat. No. 3,447,996 (1969). Himmelheber proposed a core of extruded adhesive coated wood chips or shavings oriented approximately normal to the plane of the panel and having surface layers of adhesive coated wood fibers transverse to the direction of the core fibers. Himmelheber noted that if hardwood chips were used for the core, the resulting board would be excessively heavy.

During the 1970's attempts were made to utilize certain of the hardwoods existing, for example, at the southern pine sites. The U.S. Forest Service was in the forefront of this work, and its research included tests of different types of flakers and studies of the characteristics of each of the various species of hardwoods found at the southern pine sites. A summary report by Hse et al., entitled "Laboratory-Scale Development of a Structural Exterior Flakeboard from Hardwoods Growing on Southern Pine Sites," was published in (25) *Forest Products Journal*, April 1975, pp. 42–50. This report concluded that for boards or panels having a density below 50 pounds per cubic foot which would qualify as a medium density panel, an addition of 20 percent of southern pine softwood was necessary even to come close to the specifications promulgated in 1973 by the U.S. Forest Service laboratory at Madison, Wisconsin for a medium density structural board. These specifications were:

| Property | Target or Goal |
| --- | --- |
| Modulus of Elasticity (MOE) in bending | 800,000 psi |
| Modulus of Rupture (MOR) | 4,500 psi |
| Internal Bond Strength (IB) | |
|   Dry | 70 psi |
|   After Accelerated Aging (AA) (ASTM D1037) | 35 psi |
| Lateral Nail Resistance (½" thick board) | 300 lb. |
| Nailhead Pullthrough (½" thick board) | 250 lb. |
| Nail Withdrawal from Dry Board | 40 lb. |
| Hardness | 500–1200 lb. |
| Linear Expansion (30–90% RH) | 0.25% |
| Thickness Swelling (30–90% RH) | 8% |
| Density | 37–43 lb./ft$^3$. |

Further work by the Forest Service is reported in an article by Hse entitled "Exterior Structural Composite Panels with Southern Pine Veneer Faces and Cores of Southern Hardwood Flakes," published in (26) *Forest Products Journal*, July 1976, pp. 21–27. Although the wood flakes used in this work were carefully cut in a laboratory peeling machine to precise dimensions, visual observation of the samples shows horizontal (interlaminar or in-the-plane) shear failures and the data shows excessive thickness swelling in the 5-hour boil test (22–57 percent swelling) and in the vacuum-pressure soak (VPS) test (20–32 percent swelling). No specific data on the internal bond strength was reported, but the horizontal shear failures and the excessive thickness swelling indicate an insufficient internal bond strength.

A "fast-cure phenolic resin" developed by Hse and referred to in the April 1976 *Forest Products Journal* article, supra, is disclosed in the recent Hse U.S. Pat. No. 4,209,433 (1980). This patent suggested the use of an organic polyisocyanate/phenolic resin adhesive and described a method of first applying the organic polyisocyanate to the wood furnish and then applying the phenolic resin to the wood furnish. The use of this procedure was said to improve the internal bond strength of the product.

In addition to the above references, attention may be called to the Yan Canadian Pat. No. 584,444 (1959) which related to a method for providing uniform density to the layers of a particleboard. Elmendorf U.S. Pat. No. 3,478,861 (1969) disclosed a method of aligning flakes in the face layers of a particleboard but does not teach the production of a medium density board made from flakes of hardwood species.

As noted above, the several prior art medium density products have been formed from low density species and softwoods. Where attempts have been made to use mixed species of hardwoods, difficulties in bonding resulted. This was noted by Maloney in his book, *Modern Particleboard & Dry-Process Fiberboard Manufacturing*, Miller Freeman Publications, San Francisco (1977), at p. 161:

"The reason for preferential use of the relatively light species is that they can be compressed into medium-density particleboards with the assurance that sufficient interparticle contact area is developed during the pressing operation to achieve good bonding. Heavier species simply cannot be compressed into medium-density particleboards that are well bonded."

Hunt et al. U.S. Pat. No. 4,246,310 disclosed more recent work by the Forest Service in the structural particleboard area. The Hunt patent discloses a structural board for roof decking made solely from high density species of hardwood and does not suggest that mixtures of high and low density hardwood species having widely varying properties could be employed for roof decking or other purposes. The Hunt patent discloses no data concerning the effects of aging on the internal bond strength of the Hunt structural board. However, the Forest Service has established that the red oak structural boards, though adequate for roof decking, do not meet its own criteria for structural sheathing panels with respect to the internal bond strength retention. See Hunt, M. O., Hoover, W. L., Fergus, D. A., Lehman, W. F., and McNatt, S. D., 1978, *Red Oak Structural Particleboard for Industrial/Commercial Roof Decking*, Purdue University, Agricultural Experiment Station, Research Bulletin 954.

SUMMARY OF THE INVENTION

Applicants have discovered a solution to the problem as posed by Maloney and as redefined in the continuing work of the Forest Service set forth above; specifically, applicants have produced a lamina for medium density (i.e., 40–50 pounds per cubic foot) structural flakeboard made from flakes of mixed hardwood species.

In applicants' product, the wood flakes are cross-cut so as to have a length of up to 6 inches, a width of up to 2 inches, and a thickness in the range of 0.010 to 0.100 inch. Within these limits, the flakes are sized to have a slenderness ratio (ratio of flake length to flake thickness) in excess of 30 and an aspect ratio (ratio of flake length to flake width) in excess of 1.5.

The flakes can be random or aligned (or oriented) in the lamina in the plane of the lamina. The degree of alignment or orientation is measured by the ratio of the modulus of elasticity (MOE) along the length of the panel to the modulus of elasticity across the width of the panel wherein the ratio lies in the range of 1.0 to 7.0. Where a panel is formed comprising, for example, three lamina, the flake orientation in the central or core lamina may be random, aligned transverse to the length of the panel, or aligned parallel to the length of the panel. A different slenderness ratio can be employed for the core than is employed for the face lamina.

Fines may be employed up to a maximum of about 30 percent. The use of fines in the surface of the face lamina is effective for improved smoothness.

Applicants have discovered that mixed species of hardwood flakes as set forth above may be formed into a satisfactory medium density board through the use of 2 to 9% of a thermosetting phenol formaldehyde resin having a formaldehyde/phenol ratio of about 1.4 to about 2.0 and preferably approximately 1.5–1.6 and containing a major quantity of a low molecular weight fraction together with up to 5 percent wax. The function of the low molecular weight fraction of the resin is to ensure sufficient adsorption and anchoraging of resin into the dense hardwood cell wall. Phenol formaldehyde adhesives with 70 percent or more of their molecular weight in the range of 0–3000 units are suitable for bonding mixed hardwoods.

The board product may be formed by conventional mat forming processes and pressed in conventional presses. Press pressures in the range of 150 to 800 psi. are employed at temperatures up to a maximum of 600° F. but preferably in the range of 360° to 420° F.

Further details and examples of the invention will be pointed out in the following detailed description.

DETAILED DESCRIPTION OF THE INVENTION

It has already been noted that timber lands, particularly those at southern pine sites, contain, in addition to the southern pine, a substantial quantity of various hardwood species, including as many as 12 or more species of oak. These hardwoods vary in quantity from individual species representing substantially less than 0.5 percent of the total hardwood volume, to species such as sweetgum, which can comprise 13 percent or more of the regional hardwood volume. Similarly, the species average specific gravity (oven dry weight volume at 12 percent moisture content) can vary from 0.3 to 0.9 with coefficients of variation within species exceeding 10 percent.

This invention resulted from a project to design and develop a medium density mixed hardwood lamina that exceeds American Plywood Association ("APA") performance standards for structural use panels and meets or exceeds strength requirements as specified by all U.S. Model Building Codes, while showing high strength retention and resistance to delamination when weathered.

Lamina and Board Performance

Despite the great difference in species, the tremendous differences in their flaking characteristics, shrinkage and swelling properties, specific gravity and other standard wood technology physical and mechanical attributes, applicants have found it possible to use mixed hardwood species. The mixture of hardwood species comprises between 10 and 90 percent, by weight, high density hardwood species having individual species average specific gravities not less than 0.6.

To make the lamina, the raw hardwood is cut into flakes of the desired particle geometry. This can be accomplished by cross-cutting flakes from logs by the use of drum or disc type flakers, or by first forming large chips, known as "super chips," and then further processing the chips into flakes of the desired dimension.

It may be convenient to perform the "super-chip" chipping process on site in the field since it is easier to transport chips than irregular tree trunks and branches. In any event, it may be desirable to segregate roundwood to be flaked or whole trees being processed into "super-chips" by species or species groups so that blending of the final flakes can be better controlled and a more uniform end product produced.

For limbs and twigs too small for a chipper such as the Morbark chipper, the Pallmann PHT drum chipper, for example, may be used. It will be appreciated that the chips resulting from processing limbs and twigs will be somewhat smaller than the Morbark chips. The "super chips" are then conveniently processed in, for example, disc or ring flakers to the desired final particle thickness, the maximum length having been established when the "super chip" was cut. The ring flaker may be, for example, a Black Clawson MKZ or a Pallmann PZ-8 machine. Larger Pallmann ring flakers such as a PZ-14 or Z-16 can also be used. Disc flakers may be preferable to ring flakers since they tend to produce a more uniform flake from the "super chip."

Where very high slenderness ratios are required, it may be desirable to produce the furnish for the lamina from, for example, steamed or unsteamed chips defibrated in a thermal, mechanical, or atmospheric refiner. Satisfactory refiners are produced by firms such as the Bauer, Sprout Waldron, and Defibrator companies. This high slenderness ratio furnish is best utilized for laminas that are to be painted, finished, or embossed.

Flakes produced from either logs or "super chips" may be reduced by a subsequent milling process into more desirable length to width ratios. Splitting is accomplished, for example, by high RPM fans (1000–2000 RPM impeller speed), hammermills, or ring flakers that have been modified by having their cutting rings removed. Some splitting or flake width reduction will occur in the downstream processing steps, for example, in the dryer, blender, and surge bins.

After the flakes have been split, they are essentially in their final targeted particle geometry. Milled flakes are generally binned and metered uniformly to a dryer. Flakes may be binned by species, species groups, or as the hardwood mix in total. An alternative to milling before binning is to mill between bin and dryer. In this manner, a more uniform flow stream is delivered to the flake splitter, thereby reducing clogging and overloading problems.

The finished flakes are then dried, for example, in a single or triple pass drum dryer. Desired flake moisture content is between 1 and 15 percent on an ovendry basis with lower moisture content flakes resulting in better resin penetration and shorter press cycles for the finished lamina. The dried flakes may be binned and then screened or screened directly from the dryer. A triple deck screen is one way to separate fines or wood dust from the desired flakes and to remove oversize wafers that have passed through the milling operation unattritioned.

The lower deck screen may be sized with openings between 1/32 to ¼ inch depending on the amount of fines removal desired. Fines, when deposited on a board surface, tend to improve the surface smoothness and paintability, but also tend to degrade the bending strength of the panel because of their shorter fiber length.

Moreover, the fines increase the resin requirements because of their large ratio of area to volume. In general, applicants' product can accommodate up to about 30 percent fines, although a preferable quantity for commercial use would be in the vicinity of 20 percent or less. One effect of fines on medium density mixed hardwood lamina is to increase the tendency toward delamination. For example, at 30 percent fines, only 60 percent of the samples in a test passed a 6-cycle vacuum pressure soak (APA test) without delaminating, while when fines were reduced to 10 percent, all of the samples passed the 6-cycle vacuum pressure soak without delaminating. The construction details for panels used in the delamination example referred to above included:

Lamina—0.500 inch thickness; single-layer; flake orientation parallel to panel long axis
Density—45 lb/ft.$^3$
Flakes—mixed southern hardwood species; 0.045 inch-thick; ring cut; average flake length 1.5 inch
Slenderness ratio—33
Aspect ratio—approx. 3
Mat Moisture Content—12 percent
Orientation—greater than 2.0
Resin—6 percent addition level of phenol formaldehyde
Wax—1 percent addition level Flakes retained on the oversized screen, generally ¾ inch or larger mesh, can be fed through a fan, hammermill, or modified ring flaker (cutting ring removed) and then fed back to the screening apparatus.

An alternative to a three-deck screen would be a four-deck system in which the acceptable flakes are directed to the lamina surface during the mat forming step while the smaller size acceptable flakes can be directed into a lamina that is intended as a core for a multi-lamina flake panel or veneer overlaid panel, or as the surface lamina for a siding or paint grade panel.

The wood flake furnish thereafter is blended with 2 to 9 percent, or preferably, 4 to 9 percent, of a water-resistant adhesive and up to 5.0 percent of a wax emulsion in, for example, a paddle or drum blender. Blending occurs just prior to the mat forming operation. For the water-resistant adhesive, applicants have found that the durability and strength qualities of bonds formed with cured phenol formaldehyde (PF) resole resins used to bond mixed hardwood lamina are dependent on resin physical and chemical properties, species composition of the wood substrate, and press temperature-time relationships. The characteristics of the resin prior to curing that affect mixed hardwood lamina strength retention and resistance to delamination when weathered include molecular weight distribution, formaldehyde/phenol (F/P) molar ratios, thermal curing behaviors, and resin buffering capacity. For the purpose of the present invention, applicants have selected phenol formaldehyde resins with the following general characteristics:

Low molecular weight distribution. Sufficient adsorption and anchorage of resin into the wood material are assured when 70 percent or more of the molecular weight fractions are in the range of 0–3000 molecular weight.

Good buffering capacity to acidic extractives. The following equation defines a phenol/formaldehyde resin (Reichhold 22-743) that has good buffering capacity to acidic extractive:

$pH \geq 11.29 - 0.0513 \times (mls.\ 0.5\ normal\ hydrochloric\ acid)^2$.

Similar curves can be obtained for other phenol/formaldehyde resins of interest by conducting standard titrations.

Rapid and complete cure at a panel core temperature of at least 320° F. during hot pressing.

A formaldehyde/phenol molar ratio in a range of 1.4:1 to 2.0:1, and preferably 1.5:1 to 1.6:1.

A pH in the range of 9.0 to 13.0 and solids content ranging from 35 to 95 percent.

Applicants have determined that the following resins meet the above-stated resin specifications and satisfy the durability, strength and dimensional properties required both for a single lamina and for a panel comprised of three or more laminas: Reichhold 22-743, Georgia Pacific 31-75 and 91-49, Plenco 650, and Borden PB-117.

A high strength PF adhesive bond requires an initial penetration of the resin deep into the micropore structure of the wood so as to provide a mechanical anchorage effect. Because of their high polarity, thermosetting PF resins form strong hydrogen bonds with wood hydroxyls and develop dipole-dipole interactions and van der Waals forces at surfaces. The ability of a resin to wet the wood, flow across the surface and penetrate the wood substance is related to the size of molecules in the resin system. The maximum size molecule that can diffuse into a swollen hardwood cell wall has a molecular weight of about 3000; therefore, resin molecular weight distribution significantly affects resin penetration into, and anchorage within, the wood substance.

The inability of medium- and high-molecular weight range resins to produce durable glue bonds (as measured by the APA 6-cycle vacuum pressure soak tests) may be due, in part, to insufficient resin penetration into the wood micropore system. It is believed that thin droplets of such resins form hydrogen bonds and dipole-dipole interactions with the wood material at surfaces and in gross capillaries. However, when the hardwood flake-resin system is exposed to the cyclic hot water, vacuum-pressure-soak-ovendry treatment (APA 6-cycle test), the stresses of repeated swelling and shrinkage of the high density wood cell walls, accompanied by hydrolysis of these "surface bonds," destroys the continuity of the thin, unanchored adhesive films.

Gel permeation chromatography (GPC) analyses of commercially available PF resins verifies that the most optimum durability results for medium density mixed hardwood lamina have been obtained with the resins high in low molecular weight fractions referred to above.

Differential scanning calorimetry (DSC) analyses of the water-resistant adhesives specified above indicate that complete or nearly complete cure can be obtained in about 2 minutes at a 320° F. curing temperature as shown in Table 1, below.

TABLE 1

CURING BEHAVIOR OF SELECTED PHENOLIC RESINS FOR MIXED HARDWOOD LAMINA USING DIFFERENTIAL SCANNING COLORIMETRY

| RESIN | °F. TEMPERATURE | % RESIN CURE | | | | | |
|---|---|---|---|---|---|---|---|
| | | 1 Minute | 2 Minutes | 3 Minutes | 4 Minutes | 5 Minutes | 6 Minutes |
| RCI 22-743 | 284 | 25 | 53 | 78 | 95 | 99 | 100 |
| | 320 | 75 | 100 | | | | |
| | 356 | 76 | 97 | | | | |
| GP 31-75 | 248 | 34 | 54 | 83 | 97 | 100 | |
| | 284 | 63 | 89 | 93 | 100 | | |
| | 320 | 100 | | | | | |
| PL650 | 248 | 19 | 29 | 72 | 78 | | |
| | 284 | 60 | 86 | 100 | | | |
| | 320 | 91 | 100 | | | | |

This type of analysis can be used to determine the time required to cure a specific resin over a range of curing temperatures and is useful in designing press cycles, both in the pilot plant and production environments, to optimize product properties for specific end-use requirements. For flakeboard products requiring high glue-bond durability, particularly for APA Exterior Exposure-1 requirements, it may be necessary to achieve a panel core temperature of 320° F. (during pressing) for approximately 2 minutes to obtain adequate resin cure. In this instance, press platens would have to be maintained above 320° F. in order to achieve such core temperatures.

Results of DSC studies indicate that the water-resistant adhesives that applicants have selected exhibit modest cure qualities at lower temperatures, but progressively achieve complete cure over a longer time interval. By employing post-press panel curing (hot stacking), flakeboards may be manufactured with these resins at shorter press cycle times than normally required for optimum resin cure. For ½ inch thick mixed hardwood flakeboard panels, press cycle times of about 9 to 12 minutes are generally necessary to achieve optimum resin cure. These cycle times, however, can be reduced to 6 to 8 minutes by employing hot-stacking practices. Using the applicants' selected resins and a 6 to 8 minute press time with hot-stacking, the following improvements have been shown for the lamina as compared to lamina pressed without subsequent hot stacking:

| | Durability APA Exterior Exposure-1 Performance | Springback (%) | Thickness Swell (%) | Linear Expansion | Internal Bond Strength Retention |
|---|---|---|---|---|---|
| % Improvement in Property due to Hot Stacking | 78 | 37.9 | 17.6 | 33 | 6.3 |

Resin buffering capacity is the ability of a particular resin system to tolerate changes in pH, incurred by the wood furnish, without adversely affecting resin cure. The extractives present in many hardwoods, especially the heartwood fraction, are acidic and tend to lower the pH of the resin. Typical southern hardwood species have a pH range of about 4.9 to 6.3. The acidity of wood increases if the wood is heated, as in the hot pressing during the lamina manufacturing process. Extractives migrate into glue lines and, with increasing depth of penetration of resin into the wood structure, become concentrated in the resin system. The water and alcohol soluble extractives present in mixed southern hardwoods, for example, consist mainly of condensed and hydrolyzable tannins and phenolic acids. These acidic constituents can migrate into resin droplets on blended flakes and interfere with resin cure by:

1. causing reaction conditions to change through adjustments in resin pH which tends to precipitate resin solids; and
2. participating in cross-linking reactions and causing premature gelation, prior to hot pressing.

The applicants have found that 2 to 9 percent, or, preferably, 4 to 9 percent, of a water-resistant phenol resin that conforms to the buffer requirement set forth above, produces panels with acceptable durability and strength retention when subjected to APA exposure tests.

After blending, the flake, resin and wax mixture should have a moisture content range of about 2 to 12 percent. In general, the lower the moisture content range of furnish in the mat, the faster the heat up to targeted core temperatures occurs in the press. For example, decreasing the moisture content from 10 to 2.5 percent resulted in a decrease in press time from 8 to 6 minutes for a ½ inch lamina to develop adequate resin cure. At a 6 minute press cycle the reduction in moisture content resulted in a 50 percent improvement in lamina resistance to vacuum pressure soaking delamination. It is believed that the reason for this improvement is because higher moisture content mats do not reach adequate curing temperatures. Low mat moisture content can be obtained, for instance, by drying the wood flakes in a hot air or steam drum dryer or radio frequency apparatus prior to forming or pressing.

Mat forming may be accomplished either by the single-pass or multi-pass technique. The desired flake orientation may be attained by the use of a mechanical or electrostatic orienter, both of which are commercially available. Satisfactory mechanical orienters used to produce oriented or aligned versions of the applicants' lamina are available from the Leckenby, Siempelkamp, and Bison Corporations, among others. Where orientation is desired, the aspect ratio of the flakes should be at least 1.5 so that the orienting machines can align the flakes with their longitudinal grain direction consistent from flake-to-flake.

The mat may be pressed in a single-opening or multi-opening press operated in the range of 150 to 800 psi, preferably about 400 psi, and at a temperature not in excess of 600° F. The press time varies with the thickness of the lamina and may be, for example, about 3–5 minutes for a ¼ inch lamina and 6–9 minutes for a ½ inch lamina. The time of the cycle is determined by the core temperature required to cure the resin and the hot stacking practice as previously discussed.

Where a flakeboard lamina is used as the core of a product having wood veneer, hardboard, fiberboard or other lamina as an outer lamina, it may be desirable to sand the finished core on a drum sander to produce an accurately sized core with a surface well adapted to further bonding. Outer lamina may be hot-pressed to the core using typical plywood practice.

Where multi-ply panels are formed from flakeboard lamina for use by itself or as a core for another outer lamina, as suggested above, the flake orientation of the core lamina may be random, oriented across the width of the panel or aligned parallel to the length of the panel. The flakeboard lamina may preferably be sanded prior to lay-up so as to provide an accurately sized core and a clean surface amenable to hot-pressing. In this instance, a standard plywood adhesive and pressing practice could be used to produce a multi-layer panel from individual lamina.

As a preferred alternative, a multi-layer panel can be formed as a mat by distributing the flakes to the caul in sequence through separate orienters. When this procedure is used, it may be desirable, although not necessary, to apply an additional quantity of the phenol formaldehyde resin at the interface of flake layers within the mat. In this manner, a complete multi-layer panel composite board may be made in a single forming and pressing operation.

The effect of slenderness ratio and density on dry and retained modulus of elasticity and modulus of rupture values, after weathering, for mixed southern hardwood flakeboard lamina when manufactured as described above, is shown in Tables 2 to 5, below.

TABLE 2

MIXED SOUTHERN HARDWOOD ½″ RANDOM FLAKEBOARD LAMINA
(Modulus of Elasticity, MOE)

| DENSITY[4] (p.c.f.) | DRY[1] MOE PARALLEL (psi × 10$^6$) | RETAINED[2] MOE PARALLEL (psi × 10$^6$) | RETAINED[2] MOE PARALLEL (%) |
|---|---|---|---|
| 40 | 0.346 | 0.173 | 49.9 |
| 45 | 0.460 | 0.277 | 60.3 |
| 50 | 0.588 | 0.404 | 68.7 |

| SLENDER- NESS[3] RATIO | DRY[1] MOE PARALLEL (psi × 10$^6$) | RETAINED[2] MOE PARALLEL (psi × 10$^6$) | RETAINED[2] MOE PARALLEL (%) |
|---|---|---|---|
| 200 | 0.460 | 0.277 | 60.3 |
| 100 | 0.417 | 0.298 | 71.5 |
| 66.7 | 0.375 | 0.285 | 75.9 |
| 33.3 | 0.375 | 0.299 | 79.8 |

[1]Specimens conditioned to 74° F., 65% RH - tested according to ASTM D1037-78
[2]Tested after 1 cycle of APA test method D-5 according to ASTM D1037-78
[3]Ratio of flake length to flake thickness - all values at 45 pcf (O.D. weight, volume at 74° F., 65% RH)
[4]Based upon O.D. weight and volume at 74° F., 65% RH

TABLE 3

MIXED SOUTHERN HARDWOOD ½″ ALIGNED FLAKEBOARD LAMINA
(Modulus of Elasticity, MOE)

| DENSITY[4] (p.c.f.) | DRY[1] MOE PARALLEL (psi × 10$^6$) | RETAINED[2] MOE PARALLEL (psi × 10$^6$) | RETAINED[2] MOE PARALLEL (%) |
|---|---|---|---|
| 40 | 0.850 | 0.645 | 75.9 |
| 45 | 1.130 | 0.834 | 73.8 |
| 50 | 1.170 | 0.838 | 71.6 |

| SLENDER- NESS[3] RATIO | DRY[1] MOE PARALLEL (psi × 10$^6$) | RETAINED[2] MOE PARALLEL (psi × 10$^6$) | RETAINED[2] MOE PARALLEL (%) |
|---|---|---|---|
| 200 | 1.130 | 0.834 | 73.4 |
| 100 | 1.110 | 0.729 | 65.7 |
| 66.7 | 1.073 | 0.715 | 66.6 |
| 33.3 | 0.741 | 0.512 | 69.1 |

[1]Specimens conditioned to 74° F., 65% RH - tested according to ASTM D1037-78
[2]Tested after 1 cycle of APA test method D-5 according to ASTM D1037-78
[3]Ratio of flake length to flake thickness - all values at 45 pcf (O.D. weight, volume at 74° F., 65% RH)
[4]Based upon O.D. weight and volume at 74° F., 65% RH

TABLE 4

MIXED SOUTHERN HARDWOOD ½" RANDOM FLAKEBOARD LAMINA
(Modulus of Rupture, MOR)

| DENSITY[4] (p.c.f.) | DRY[1] MOR PARALLEL (psi × 10$^6$) | RETAINED[2] MOR PARALLEL (psi × 10$^6$) | RETAINED[2] MOR PARALLEL (%) |
|---|---|---|---|
| 40 | 1520 | 1010 | 66.7 |
| 45 | 2530 | 1560 | 61.6 |
| 50 | 4480 | 2300 | 51.4 |

| SLENDER-NESS[3] RATIO | DRY[1] MOR PARALLEL (psi × 10$^6$) | RETAINED[2] MOR PARALLEL (psi × 10$^6$) | RETAINED[2] MOR PARALLEL (%) |
|---|---|---|---|
| 200 | 2530 | 1560 | 61.6 |
| 100 | 2040 | 1420 | 69.4 |
| 66.7 | 1640 | 1180 | 72.0 |
| 33.3 | 2050 | 1530 | 74.6 |

[1]Specimens conditioned to 74° F., 65% RH - tested acccording to ASTM D1037-78 (Slenderness Ratio = 200)
[2]Tested after 1 cycle of APA test method D-5 according to ASTM D1037-78
[3]Ratio of flake length to flake thickness - all values at 45 pcf (O.D. weight, volume at 74° F., 65% RH)
[4]Based upon O.D. weight and volume at 74° F., 65% RH

TABLE 5

MIXED SOUTHERN HARDWOOD ½" ALIGNED FLAKEBOARD LAMINA
(Modulus of Rupture, MOR)

| DENSITY[4] (p.c.f.) | DRY[1] MOR PARALLEL (psi) | RETAINED[2] MOR PARALLEL (psi) | RETAINED[2] MOR PARALLEL (%) |
|---|---|---|---|
| 40 | 4660 | 3110 | 66.7 |
| 45 | 4880 | 3010 | 61.6 |
| 50 | 5100 | 2900 | 56.8 |

| FLAKE[3] LENGTH (in) | DRY[1] MOR PARALLEL (psi) | RETAINED[2] MOR PARALLEL (psi) | RETAINED[2] MOR PARALLEL (%) |
|---|---|---|---|
| 3.0 | 4880 | 3010 | 61.6 |
| 1.5 | 3170 | 2200 | 69.4 |
| 1.0 | 2600 | 1870 | 72.2 |
| 0.5 | 2020 | 1520 | 75.2 |

[1]Specimens conditioned to 74° F., 65% RH - tested according to ASTM D1037-78 (Slenderness Ratio = 200)
[2]Tested after 1 cycle of APA test method D-5 according to ASTM D1037-78
[3]No thickness effect evident in the model
[4]Based upon O.D. weight and volume at 74° F., 65% RH Applicants have found that lamina in accordance with the present invention, when used as a random or oriented laminate by itself, or when used as a core of a product having wood veneer outer lamina, or if used to make a multi-ply flake panel in a single or multi-pressing sequence, produces a panel of superior flatness having no more than 0.01 inch warp, twist, cup, or bow per inch of panel length, width, or diagonal distance.

TESTING RESULTS

In order to determine the acceptability of lamina made in accordance with the present invention, full-size panels were produced and tested according to standard American Plywood Association (APA) or American Society for Testing Material (ASTM) procedures. Panels were produced for three separate trials as set forth below.

(1) TRIAL I: MEDIUM DENSITY MIXED SOUTHERN HARDWOOD LAMINA CORE WITH SOUTHERN YELLOW PINE (SYP) OUTER LAMINA

A. ½ inch thick 3-layer panels—SYP ⅛ inch veneer faces and single-layer mixed southern hardwood flakeboard core lamina.

B. Nominal ¾ inch thick 3-layer panels—SYP ⅛ inch veneer faces and single-layer mixed southern hardwood flakeboard core lamina.

(2) TRIAL II: MULTI-LAYER MEDIUM DENSITY MIXED HARDWOOD LAMINA

A. ½ inch thick 3-layer oriented flakeboard—all layers mixed southern hardwood.

B. ¾ inch thick 3-layer oriented flakeboard—all layers mixed southern hardwood.

C. ½ inch thick 3-layer oriented flakeboard—all layers mixed northern hardwood.

D. ¾ inch thick 3-layer oriented flakeboard—all layers mixed northern hardwood.

(3) TRIAL III: MULTI-LAYER MEDIUM DENSITY MIXED HARDWOOD LAMINA AND MULTI-LAYER MEDIUM DENSITY MIXED HARDWOOD CORE LAMINA WITH SOUTHERN PINE VENEER OUTER LAMINA

A. ½ inch thick 3-layer lamina—all layers mixed southern hardwood.

B. ¾ inch thick 5-layer composite plywood—SYP ⅛ inch veneer faces with a 3-layer mixed southern hardwood lamina core.

TRIAL I

A group of sample panels containing ¼ inch and ½ inch lamina cores of mixed southern hardwood manufactured from "super chips" that produced flakes 3 to 5 inches in length, ½ to 1 inch in width, and 0.020 inch thick, were overlaid with ⅛ inch southern pine veneer. The degree of orientation ranged between 3.3 to 4.9. Fines content was not more than 20 percent. The resultant product manufactured from said lamina had exceptionally high strength retention and resistance to delamination when weathered, and exceeded American Plywood Association and U.S. Model Building Code Standards as shown in Tables 6 to 8, below.

TABLE 6

AVERAGE RESULTS OF FLEXURE TESTS

| PANEL TYPE | DI-REC-TION* | BEND-ING STIFF-NESS, lb.-in.$^2$/ ft width | MODU-LUS OF ELAS-TICITY, (10$^6$ psi) | MAX. BEND-ING MO-MENT lb.-in./ ft width | MODU-LUS OF RUP-TURE, (psi) |
|---|---|---|---|---|---|
| ½ in. thick | | | | | |
| SYP Veneer | P | 223,000 | 1.780 | 3530 | 7060 |
| S. Hardwood Core | T | 26,600 | 0.213 | 681 | 1360 |
| Plywood Design Values** | P | 187,300 | 1.500 | 1960 | 3910 |
| | T | 10,900 | 0.087 | 451 | 902 |
| ¾ in. thick | | | | | |
| SYP Veneer | P | 767,000 | 1.820 | 8380 | 7450 |
| So. Hardwood Core | T | 185,000 | 0.439 | 3410 | 3030 |
| Plywood Design | P | 529,000 | 1.250 | 3970 | 3530 |

TABLE 6-continued

AVERAGE RESULTS OF FLEXURE TESTS

| PANEL TYPE | DIRECTION* | BENDING STIFFNESS, lb.-in.²/ ft width | MODULUS OF ELASTICITY, (10⁶ psi) | MAX. BENDING MOMENT lb.-in./ ft width | MODULUS OF RUPTURE, (psi) |
|---|---|---|---|---|---|
| Values** | T | 78,400 | 0.186 | 1840 | 1630 |

*P—Parallel, T—Tranverse (perpendicular to panel face-grain direction).
**From plywood design specification. American Plywood Association. In: Plywood Design Specification. Tacoma, Wa. December 1974.

A second set of multi-layer products was produced from lamina that was manufactured from cross-cut flakes produced from roundwood that resulted in flakes having a geometry of 2.84 inches in length, ¼ to ½ inch in width, and 0.015 inch in thickness. The continuously formed multi-layer lamina was nominally 0.500 and 0.750 inch in thickness. The degree of orientation for face lamina was between 4 and 6, while the degree of orientation for core lamina was 1.5 to 3. Mixed hardwood resources were used in the preparations of these panels. The resultant product manufactured from these lamina had excellent strength retention when weathered and properties that exceeded APA standards and

TABLE 7

AVERAGE RESULTS OF CONCENTRATED STATIC LOAD TESTS

| | ½ in. ROOF SHEATING, 24 in. OC* | | | | ½ in. SUBFLOOR, 16 in. OC* | | | | ¾ in. T&G SINGLE FLOOR, 24 in. OC* | | | |
|---|---|---|---|---|---|---|---|---|---|---|---|---|
| | DRY | | WET | | DRY | | WET/REDRY | | DRY | | WET/REDRY | |
| PANEL TYPE | DEFLECTION, in. | ULTIMATE LOAD, lb | DEFLECTION, in. | ULTIMATE LOAD, lb | DEFLECTION, in. | ULTIMATE LOAD, lb | DEFLECTION, in. | ULTIMATE LOAD, lb | DEFLECTION, in. | ULTIMATE LOAD, lb | DEFLECTION, in. | ULTIMATE LOAD, lb |
| SYP Veneer So. Hardwood Core | 0.232 | 1287 | 0.296 | 1305 | 0.093 | 1178 | 0.115 | 877 | 0.054 | 1439 | 0.060 | 1485 |
| Maximum Limit** | 0.500 | — | NA | NA | 0.188 | — | 0.188 | — | 0.109 | — | 0.109 | — |
| Minimum Limit** | — | 400 | NA | NA | — | 400 | — | 400 | — | 550 | — | 550 |

*OC—On Center
**Proposed specification and policy for structural-use panel sheathing, APA, November 20, 1979.

TABLE 8

AVERAGE RESULTS OF CONCENTRATED IMPACT LOAD TESTS

| | ½ in. ROOF SHEATING, 24 in. OC | | | | ½ in. SUBFLOOR, 16 in. OC | | | | ¾ in. T&G SINGLE FLOOR 24 in. OC | | | |
|---|---|---|---|---|---|---|---|---|---|---|---|---|
| | DRY | | WET | | DRY | | WET | | DRY | | WET | |
| PANEL TYPE | DEFLECTION, in. | ULTIMATE LOAD, lb | DEFLECTION, in. | ULTIMATE LOAD, lb | DEFLECTION, in. | ULTIMATE LOAD, lb | DEFLECTION, in. | ULTIMATE LOAD, lb | DEFLECTION, in. | ULTIMATE LOAD, lb | DEFLECTION, in. | ULTIMATE LOAD, lb |
| SYP Veneer So. Hardwood Core | 0.226 | 1340 | 0.237 | 1449 | 0.088 | 1702 | 0.099 | 1611 | 0.047 | 2765 | 0.051 | 2422 |
| Maximum Limit* | — | — | — | — | — | — | — | — | 0.109 | — | 0.109 | — |
| Minimum Limit* | — | 300 | — | 300 | — | 400 | — | 400 | — | 400 | — | 400 |

*Proposed specification and policy for structural-use panel sheathing, APA, November 20, 1979.

TRIAL II

U.S. Model Building Codes as shown in Tables 9 to 12, below.

TABLE 9

CONCENTRATED IMPACT LOAD DATA FOR MULTI-LAYER MEDIUM DENSITY MIXED HARDWOOD LAMINA

| | ½" SHEATHING | | | | ¾" TONGUE & GROOVE | |
|---|---|---|---|---|---|---|
| | ROOF 32" O.C. | | SUBFLOOR 16" O.C. | | FLOOR 24" O.C. | |
| PANEL TYPE | REQUIRED[1] | TESTED | REQUIRED[1] | TESTED | REQUIRED[1] | TESTED |
| 3-layer Mixed Southern Hardwood | 300# min. | 604# | 400# min. | 795# | 400# min. | 2,343# |
| 3-layer Mixed Southern Hardwood | 300# min. | 761# | 400# min. | 400#[2] | 400# min. | 1,885# |

[1]By APA and U.S. Model Building Codes.
[2]Only a 400# proof load was applied after impact. Panel would have sustained a greater load.

TABLE 10

DEFLECTION UNDER CONCENTRATED STATIC LOADS FOR MULTI-LAYER MEDIUM DENSITY MIXED HARDWOOD LAMINAS

| | ½" SHEATHING | | | | ¾" TONGUE & GROOVE | |
|---|---|---|---|---|---|---|
| | ROOF 32" O.C. | | SUBFLOOR 16" O.C. | | FLOOR 24" O.C. | |
| PANEL TYPE | REQUIRED[1] (in.) | TESTED (in.) | REQUIRED[1] (in.) | TESTED (in.) | REQUIRED[1] (in.) | TESTED (in.) |
| 3-layered Mixed Southern Hardwood | .500 max. | .337 | .188 max. | .094 | .108 max. | .044 |
| 3-layered Mixed Northern Hardwood | .500 max. | .351 | .188 max. | .088 | .108 max. | .047 |

[1]By APA and U.S. Model Building Codes.

TABLE 11

CONCENTRATED STATIC LOAD DATA FOR MULTI-LAYER MEDIUM DENSITY MIXED HARDWOOD LAMINAS

| | ½" SHEATHING | | | | ¾" TONGUE & GROOVE | |
|---|---|---|---|---|---|---|
| | ROOF 32" O.C. | | SUBFLOOR 16" O.C. | | FLOOR 24" O.C. | |
| PANEL TYPE | REQUIRED[1] (lb.) | TESTED (lb.) | REQUIRED[1] (lb.) | TESTED (lb.) | REQUIRED[1] (lb.) | TESTED (lb.) |
| 3-layered Mixed Southern Hardwood | 400 min. | 678 | 400 min. | 849 | 500 min. | 1,757 |
| 3-layered Mixed Northern Hardwood | 400 min. | 604 | 400 min. | 795 | 550 min. | 1,193 |

[1]By APA and U.S. Model Building Codes.

TABLE 12

DURABILITY OF MULTI-LAYERED MEDIUM DENSITY MIXED HARDWOOD LAMINA SUBJECTED TO APA AGING STANDARD D-1 AND CONCENTRATED STATIC LOADS

| | ½" SHEATHING 16" O.C. | |
|---|---|---|
| PANEL TYPE | DEFLECTION (in.) | LOAD (lb.) |
| 3-layer Mixed Southern Hardwood | .120 | 736 |
| 3-layer Mixed Northern Hardwood | .103 | 815 |
| Required[1] | .188 max. | 400 min. |

[1]By APA and U.S. Model Building Codes.

TRIAL III

In the third trial, mixed southern hardwood cross-cut flakes having a flake length of about 2.75 inches, a thickness of about 0.015 inch, and a width between ½ and ¾ inch, were used to produce multi-layer lamina. These multi-layer laminas comprised a core with an orientation of 1 and a face with an orientation of 2.6. Resultant products had exceptional bending strength retention, internal bond strength, and conformed to the APA 6-cycle vacuum pressure soak delamination tests. Test results from small specimens of these panels are shown in Table 13.

Required Performance Level For All Structural Panels

Within the indicated density range, all mixed hardwood panels produced by inventors during the described trial met or exceeded 35 psi retained internal bond strength level after the panels are subjected to one cycle of hot water vacuum pressure soak, under 150° F., 15 in. mercury, for 30 minutes, followed by hot water soak (150° F.) at 1 atmosphere for 30 minutes and subsequently oven dried at 180° F. for 16 hours. Attainment of this minimum performance level with the difficult hardwood resource mix exceeds the boundary of prior art.

TABLE 13

TRIAL III MIXED SOUTHERN HARDWOOD AND PANEL TEST RESULTS

| | ½" THICK SO. HARDWOOD AVE. VALUE | ¾" INCH THICK SO. HARDWOOD CORE, SYP VENEER AVE. VALUE | U.S. FOREST SERVICE GOAL |
|---|---|---|---|
| Density (#/C.F.) | 43 | | 43 |
| $MOE_{11}^3$ (×10³ PSI) | 694 | 1316 | 800 |
| $MOR_{11}^2$ (PSI) | 4625 | 10626 | 4500 |
| $MOE_1$ (×10³ PSI) | 265 | 279 | — |
| $MOR_1$ (PSI) | 2499 | 2975 | — |
| % $MOE_{11}$ Retention | 65 | 83 | — |
| % $MOR_{11}$ Retention | 82 | 70 | — |
| % $MOE_1$ Retention | 81 | 90 | — |
| % $MOR_1$ Retention | 87 | 87 | — |
| $EI_{11}^3$ (lb-in²/ft × 10³) | 106 | 526 | — |
| $EI_1$ (lb-in²/ft × 10³) | 40.8 | 113 | — |
| $MBM_{11}^4$ (lb-in/ft) | 2629 | 9882 | — |
| $MBM_1$ (lb-in/ft) | 1422 | 3222 | — |
| $IB^5$ (PSI) | 115 | 127 | 70 |
| IB (PSI) Retained | 59[7] | 58[7] | 35[8] |
| % Springback | 10.5 | 7.9 | — |
| Durability Tests[6] (% Pass) | 100 | 80 | — |
| Thickness (inches) | 0.541 | 0.730 | .5 |

[1]MOE—Modulus of Elasticity
[2]MOR—Modulus of Rupture
[3]EI—Bending Stiffness
[4]MBM—Maximum Bending Moment
[5]IB—Internal Bond Strength
[6]Refers to APA Exterior Exposure-1 Probe test on Durability
[7]IB retained after 1 cycle of APA test method D-5
[8]IB retained after test method ASTM D-1037 accelerated age test The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A lamina for a medium density structural board having a density in the range of 40 to 50 pounds per cubic foot comprising wood flakes aligned along the length of the lamina, said flakes formed from a mixture of hardwood species, said mixture of hardwood species flakes comprising between 10 and 90 percent, by weight, high density hardwood species having individual species average specific gravities not less than 0.6, said flakes having a length up to 6.0 inches, a width up to 2 inches and a thickness in the range of 0.010 to 0.100 inch, the ratio of flake length to flake thickness defining a slenderness ratio greater than 30, the ratio of flake length to flake width defining an aspect ratio greater than 1.5, the ratio of the modulus of elasticity along the lamina to the modulus of elasticity across the lamina defining a degree of flake alignment in the range of 1.0 to 7.0; a phenol formaldehyde thermosetting resin in the range of 2–9 percent by weight having a formaldehyde/phenol ratio in the range of about 1.4 to 2.0 and containing a major quantity of a low molecular weight fraction; and not more than 5 percent by weight of wax, wherein the retained internal bond strength exceeds about 35 psi, after said lamina is subjected to one cycle of hot water vacuum pressure soak, under 150° F., 15 in. mercury, for 30 minutes, followed by hot water soak (150° F.) at 1 atmosphere for 30 minutes and subsequently oven dried at 180° F. for 16 hours.

2. A lamina as set forth in claim 1, wherein the molecular weight of the low molecular weight resin fraction is less than 3000.

3. A lamina as set forth in claim 2, wherein the low molecular weight fraction of the resin comprises at least 70 percent of the total weight of the resin.

4. A lamina as set forth in claim 3, wherein the phenol formaldehyde resin is in the range of 4–9 percent by weight and the formaldehyde/phenol ratio is in the range of 1.5 to 1.6.

5. A lamina for a medium density structural board having a density in the range of 40 to 50 pounds per cubic foot comprising wood flakes aligned normal to the length of the lamina, said flakes formed from a mixture of hardwood species, said mixture of hardwood species flakes comprising between 10 and 90 percent, by weight, high density hardwood species having individual species average specific gravities not less than 0.6, said flakes having a length up to 6.0 inches, a width up to 2 inches and a thickness in the range of 0.010 to 0.100 inch, the ratio of flake length to flake thickness defining a slenderness ratio greater than 30, the ratio of flake length to flake width defining an aspect ratio greater than 1.5, the ratio of the modulus of elasticity across the lamina to the modulus of elasticity along the lamina defining a degree of flake alignment in the range of 1.0 to 7.0; a phenol formaldehyde thermosetting resin in the range of 2–9 percent by weight having a formaldehyde/phenol ratio in the range of 1.4 to 2.0 and containing a major quantity of a low molecular weight fraction; and not more than 5 percent by weight of wax, wherein the retained internal bond strength exceeds about 35 psi, after said lamina is subjected to one cycle of hot water vacuum pressure soak, under 150° F., 15 in. mercury, for 30 minutes, followed by hot water soak (150° F.) at 1 atmosphere for 30 minutes and subsequently oven dried at 180° F. for 16 hours.

6. A lamina as set forth in claim 5, wherein the molecular weight of the low molecular weight resin fraction is less than 3000.

7. A lamina as set forth in claim 6, wherein the low molecular weight fraction of the resin comprises at least 70 percent of the total weight of the resin.

8. A lamina as set forth in claim 7, wherein the phenol formaldehyde resin is in the range of 4-9 percent by weight and the formaldehyde/phenol ratio is in the range of 1.5 to 1.6.

9. A medium density structural board comprising at least three lamina bonded together with a thermosetting resin wherein the core comprises a lamina having a density in the range of 40 to 50 pounds per cubic foot comprising wood flakes aligned normal to the length of the lamina, said flakes formed from a mixture of hardwood species, said mixture of hardwood species flakes comprising between 10 and 90 percent, by weight, high density hardwood species having individual species average specific gravities not less than 0.6, said flakes having a length up to 6.0 inches, a width up to 2 inches and a thickness in the range of 0.010 to 0.100 inch, the ratio of flake length to flake thickness defining a slenderness ratio greater than 30, the ratio of flake length to flake width defining an aspect ratio greater than 1.5, the ratio of the modulus of elasticity across the lamina to the modulus of elasticity along the lamina defining a degree of flake alignment in the range of 1.0 to 7.0; a phenol formaldehyde thermosetting resin in the range of 2–9 percent by weight having a formaldehyde/phenol ratio in the range of 1.4 to 2.0 and containing a major quantity of a low molecular weight fraction; and not more than 5 percent by weight of wax; wherein the retained internal bond strength exceeds about 35 psi, after said lamina is subjected to one cycle of hot water vacuum pressure soak, under 150° F., 15 in. mercury, for 30 minutes, followed by hot water soak (150° F.) at 1 atmosphere for 30 minutes and subsequently oven dried at 180° F. for 16 hours, and the lamina bonded on each side of said core comprise lamina having a density in the range of 40 to 50 pounds per cubic foot comprising wood flakes aligned along the length of the lamina, said flakes formed from a mixture of hardwood species, said mixture of hardwood species flakes comprising between 10 and 90 percent, by weight, high density hardwood species having individual species average specific gravities not less than 0.6, said flakes having a length up to 6.0 inches, a width up to 2 inches and a thickness in the range of 0.010 to 0.100 inch, the ratio of flake length to flake thickness defining a slenderness ratio greater than 30, the ratio of flake length to flake width defining an aspect ratio greater than 1.5, the ratio of the modulus of elasticity along the lamina to the modulus of elasticity across the lamina defining a degree of flake alignment in the range of 1.0 to 7.0; a phenol formaldehyde thermosetting resin in the range of 2–9 percent by weight having a formaldehyde/phenol ratio in the range of 1.4 to 2.0 and containing a major quantity of a low molecular weight fraction; and not more than 5 percent by weight of wax, wherein the retained internal bond strength exceeds about 35 psi, after said lamina is subjected to one cycle of hot water vacuum pressure soak, under 150° F., 15 in. mercury, for 30 minutes, followed by hot water soak (150° F.) at 1 atmosphere for 30 minutes and subsequently oven dried at 180° F. for 16 hours.

10. A medium density structural board as set forth in claim 9, wherein the molecular weight of the low molecular weight resin fraction in each lamina is less than 3000.

11. A medium density structural board as set forth in claim 10, wherein the low molecular weight fraction of the resin in each lamina comprises at least 70 percent of the total weight of the resin in each lamina.

12. A medium density structural board as set forth in claim 11, wherein the phenol formaldehyde resin in each lamina is in the range of 4–9 percent by weight and the formaldehyde/phenol ratio in each lamina is in the range of 1.5 to 1.6.

13. A medium density structural board as set forth in claims 9, 10, 11, or 12, having, in addition, a veneer bonded to at least one side thereof.

14. A medium density structural board as set forth in claims 9, 10, 11, or 12, having, in addition, a hardboard lamina bonded to at least one side thereof.

15. A medium density structural board as set forth in claims 9, 10, 11, or 12, having, in addition, a plywood lamina bonded to at least one side thereof.

16. A medium density structural board comprising at least three lamina bonded together with a thermosetting resin wherein the core comprises a lamina having a density in the range of 40 to 50 pounds per cubic foot comprising wood flakes aligned normal to the length of the lamina, said flakes formed from a mixture of hardwood species, said mixture of hardwood species flakes comprising between 10 and 90 percent, by weight, high density hardwood species having individual species average specific gravities not less than 0.6, said flakes having a length up to 6.0 inches, a width up to 2 inches and a thickness in the range of 0.010 to 0.100 inch, the ratio of flake length to flake thickness defining a slenderness ratio greater than 30, the ratio of flake length to flake width defining an aspect ratio greater than 1.5, the ratio of the modulus of elasticity across the lamina to the modulus of elasticity along the lamina defining a degree of flake alignment in the range of 1.0 to 7.0; a phenol formaldehyde thermosetting resin in the range of 2-9 percent by weight having a formaldehyde/phenol ratio in the range of 1.4 to 2.0 and containing a major quantity of a low molecular weight fraction; and not more than 5 percent by weight of wax, wherein the retained internal bond strength exceeds about 35 psi, after said lamina is subjected to one cycle of hot water vacuum pressure soak, under 150° F., 15 in. mercury, for 30 minutes, followed by hot water soak (150° F.) at 1 atmosphere for 30 minutes and subsequently oven dried at 180° F. for 16 hours.

17. A medium density structural board as set forth in claim 16, wherein the molecular weight of the low molecular weight resin in said core is less than 3000.

18. A medium density structural board as set forth in claim 17, wherein the low molecular weight fraction of the resin comprises at least 70 percent of the total weight of the resin.

19. A medium density structural board as set forth in claim 18, wherein the phenol formaldehyde resin is in the range of 4-9 percent by weight and the formaldehyde/phenol ratio is in the range of 1.5 to 1.6.

20. A medium density structural board as set forth in claims 16, 17, 18, or 19, having, in addition, a veneer bonded to at least one side thereof.

21. A medium density structural board as set forth in claims 16, 17, 18, or 19, having, in addition, a hardboard lamina bonded to at least one side thereof.

22. A medium density structural board as set forth in claims 16, 17, 18, or 19, having, in addition, a plywood lamina bonded to at least one side thereof.

23. A medium density structural board comprising at least three lamina bonded together with a thermosetting resin, each lamina having a density in the range of 40 to 50 pounds per cubic foot comprising wood flakes aligned along the length of the lamina, said flakes formed from a mixture of hardwood species, said mixture of hardwood species flakes comprising between 10 and 90 percent, by weight, high density hardwood species having individual species average specific gravities not less than 0.6, said flakes having a length up to 6.0 inches, a width up to 2 inches and a thickness in the range of 0.010 to 0.100 inch, the ratio of flake length to flake thickness defining a slenderness ratio greater than 30, the ratio of flake length to flake width defining an aspect ratio greater than 1.5, the ratio of the modulus of elasticity across the lamina to the modulus of elasticity along the lamina defining a degree of flake alignment in the range of 1.0 to 7.0; a phenol formaldehyde thermosetting resin in the range of 2-9 percent by weight having a formaldehyde/phenol ratio in the range of 1.4 to 2.0 and containing a major quantity of a low molecular weight fraction; and not more than 5 percent by weight of wax, wherein the retained internal bond strength exceeds about 35 psi, after said lamina is subjected to one cycle of hot water vacuum pressure soak, under 150° F., 15 in. mercury, for 30 minutes, followed by hot water soak (150° F.) at 1 atmosphere for 30 minutes and subsequently oven dried at 180° F. for 16 hours.

24. A medium density structural board as set forth in claim 23, wherein the molecular weight of the low molecular weight resin in each said lamina is less than 3000.

25. A medium density structural board as set forth in claim 24, wherein the low molecular weight fraction of the resin comprises at least 70 percent of the total weight of the resin.

26. A medium density structural board as set forth in claim 25, wherein the phenol/formaldehyde resin is in the range of 4-9 percent by weight and the formaldehyde/phenol ratio is in the range of 1.5 to 1.6.

27. A medium density structural board as set forth in claims 23, 24, 25, or 26, having, in addition, a veneer bonded to at least one side thereof.

28. A medium density structural board as set forth in claims 23, 24, 25, or 26, having, in addition, a hardboard bonded to at least one side thereof.

29. A medium density structural board as set forth in claims 23, 24, 25 or 26, having, in addition, a plywood bonded to at least one side thereof.

* * * * *